UNITED STATES PATENT OFFICE.

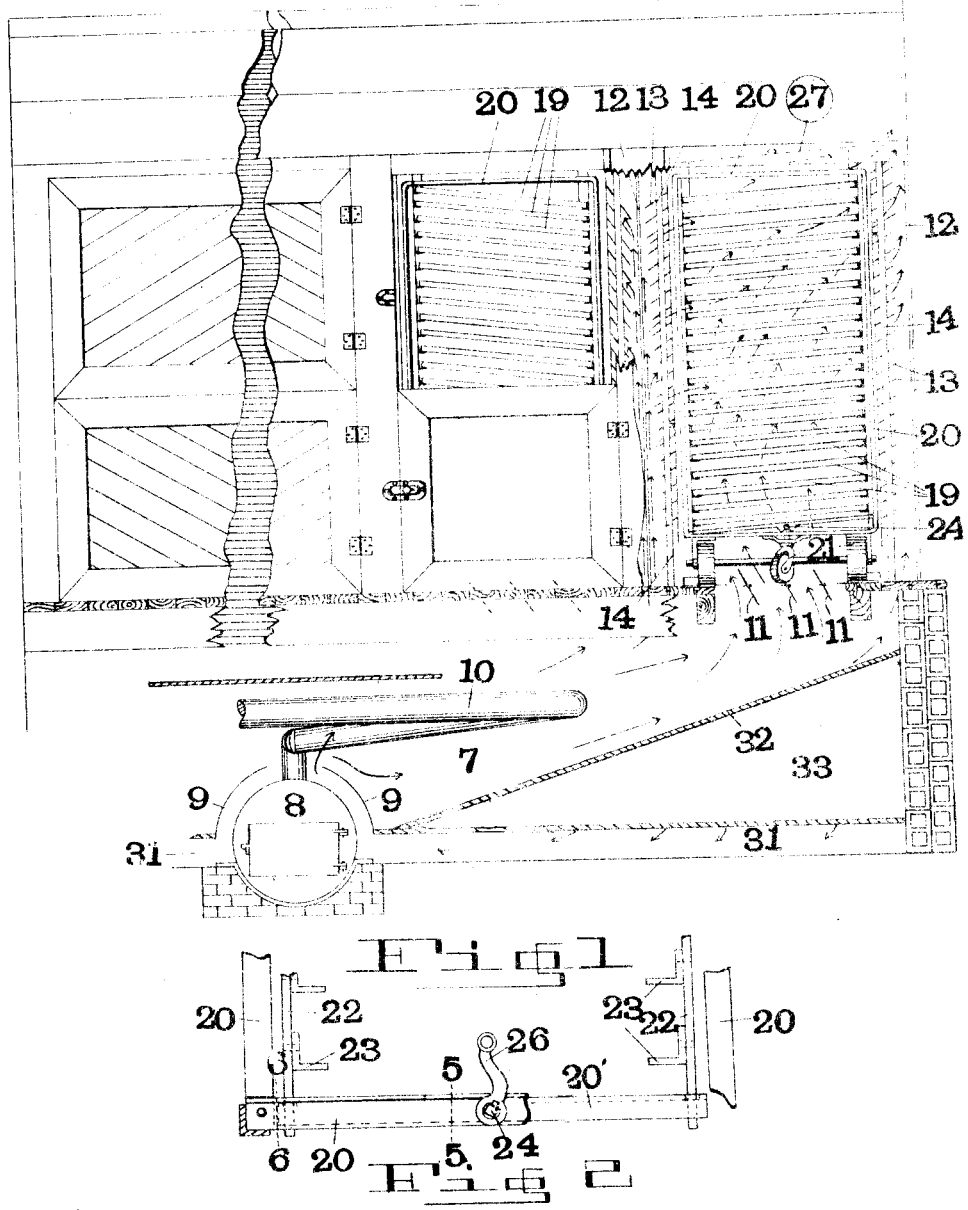

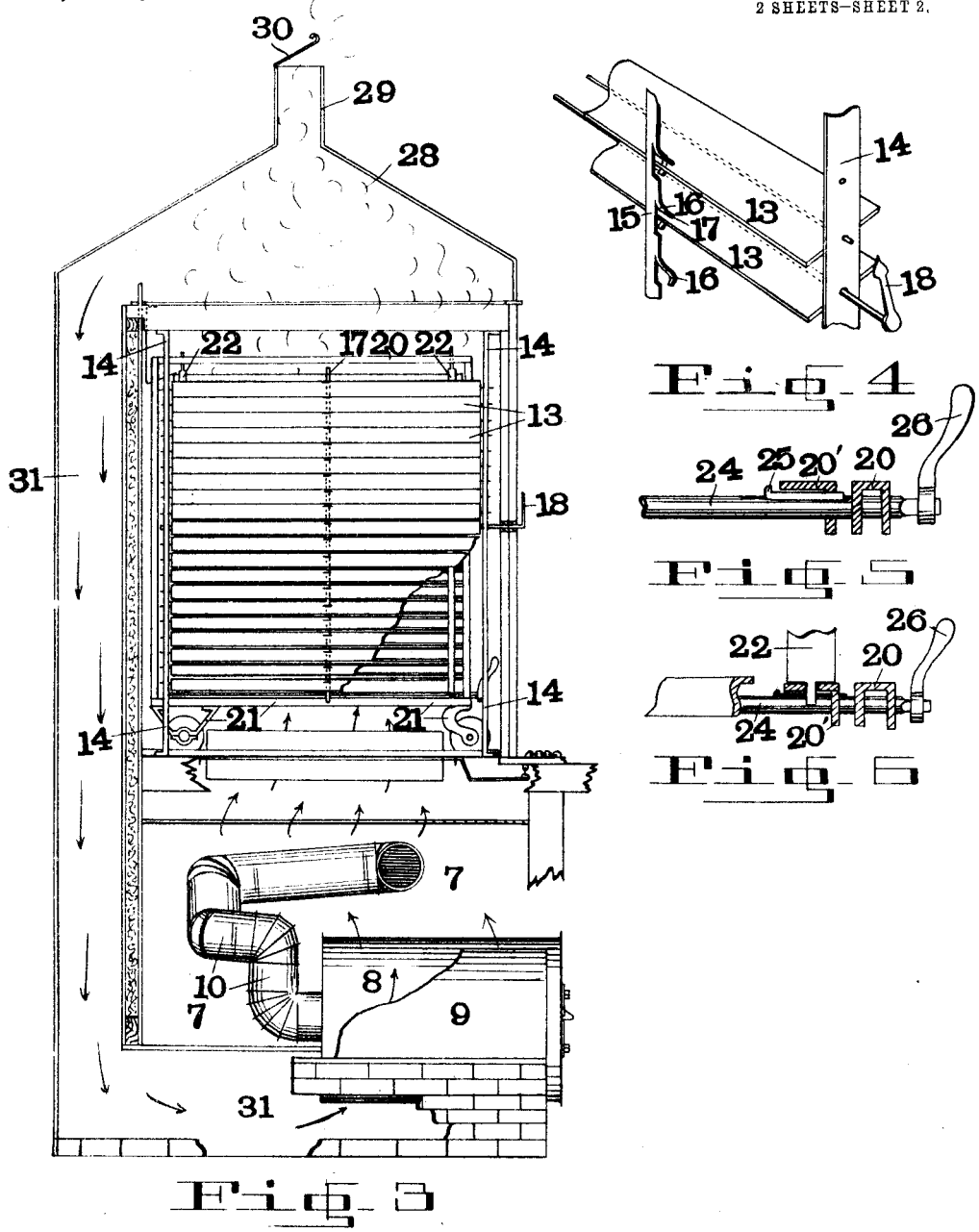

ALLAN B. KIRK AND OLIVER J. HOBSON, OF PORTLAND, OREGON, ASSIGNORS, BY MESNE ASSIGNMENTS, TO FOOD PRODUCTS CO., A CORPORATION OF OREGON.

EVAPORATOR.

1,092,796.  Specification of Letters Patent.  Patented Apr. 7, 1914.

Application filed August 24, 1912. Serial No. 716,865.

*To all whom it may concern:*

Be it known that we, ALLAN B. KIRK and OLIVER J. HOBSON, both citizens of the United States, residing in the city of Portland, county of Multnomah and State of Oregon, have invented certain new and useful Improvements in Evaporators, of which the following is a specification.

Our invention relates to evaporators, or driers, for drying fruits, vegetables and the like, and more particularly to certain improvements in the construction and arrangement thereof whereby we are able to more effectively control and regulate the circulation and distribution of heated air through and around the supporting trays containing the material to be dried, and whereby we are also able to produce a greater radiant heat within the apparatus which operates directly upon the material being treated.

Among the salient objects of our invention are, to provide in a device of the character referred to series of baffle plates pivotally mounted and adapted to act not only as deflectors for directing the heated air through and around the supporting trays, but which also become heated and serve as a source of radiant heat; to provide in a device of the character referred to series of drying trays so mounted that they can be simultaneously tilted or rocked in either direction for the purpose of more directly exposing the material to the radiant heat from the heated baffle plates, and also for the purpose of turning or rolling the material upon the trays and for holding the trays in positions best adapted to expose the fruit or other material to the circulating currents, as well as to assist in directing said heated air currents; to provide in combination with such a device controlling dampers above and below the drying chambers within which the trays are placed for the purpose of changing the direction of the heated air currents upwardly through said trays; and, in general, to provide an improved evaporator with increased facilities for conserving and utilizing the generated heat.

In order that others may understand our invention, we have shown on the accompanying sheets of drawings one practical embodiment thereof, which we will now describe.

In the drawings, Figure 1 is a front elevation of the same with parts broken out and omitted in order to reduce the size of the figure, and to more clearly illustrate the construction and arrangement thereof; Fig. 2 is an enlarged fragmentary view showing the method of tilting or rocking the supporting trays; Fig. 3 is a side elevation of one unit, with parts omitted and broken away to show the construction and arrangement thereof; Fig. 4 is an enlarged detail view showing a method of moving the baffle plates at the sides of the supporting trays; and Figs. 5 and 6 are enlarged detail views of the mechanism for manually tilting the trays, taken on lines 5—5, and 6—6, respectively of Fig. 2.

Referring now to the drawings, the embodiment of the invention here shown comprises a series of apartments or drying chambers arranged side by side and each adapted to receive a tier of supporting drying trays, preferably supported on a truck which can be run in and out of the apartment as desired, as illustrated in Fig. 1, at the right hand end thereof. These drying apartments are built directly over a heating chamber, as 7, within which is a heating apparatus, such as a fire box 8 and drum or hood 9, for heating the air passing therethrough. The smoke stack or pipe 10 is preferably carried from the fire box or furnace in a circuitous manner, as indicated, in order to increase the heating medium within the heating chamber 7.

Directly underneath each of the drying apartments, above the heating chamber 7, the construction is open and is provided with a series of dampers, as 11—11, movably mounted so as to be moved to control and direct the inflowing heated air from the heating chamber. These damper plates can be turned in either direction so as to give direction to the currents of heated air passing up into the drying apartment, as indicated by the arrows, Fig. 1. We will describe but one of these apartments, it being understood that they are alike. The apartments are separated by sheet metal walls or partitions, as 12—12. Adjacent each of said metal partitions or walls is a tier of movably mounted baffle plates, as 13—13, Figs. 1 and 4, pivotally mounted in upright supporting frames 14—14, and operatively connected together by means of a connecting strip 15, having downwardly crooked fingers 16, hooked into openings 17 in the edges of said baffle plates 13, Fig. 4. All of said baffle plates can be moved together, like window shutters, by means of an arm or lever 18, rigidly attached to one of said plates as shown. Said baffle plates or shutters 13 are also made of sheet metal and are preferably of graduated widths, the widest ones being at the top of the series and the narrower ones approaching the bottom of the tier. When they are opened into horizontal positions the wider ones at the top also catch some of the upwardly rising currents of heated air within the apartment near the walls 12—12 and direct them inwardly to the trays. If they were all of the same width the first or lower ones would catch the air currents and none would rise near the walls to be directed into the trays for drying the material adjacent the edges of said trays.

The drying trays 19 are supported one above the other in vertical tiers in an upright frame, as 20, preferably mounted upon a truck, as 21, whereby they can be run into and out of the drying apartments, between the series of baffle plates 13, at will. The supporting frames for the trays are preferably made of angle irons, as indicated, Fig. 2, and within each frame is a tilting frame composed of the base piece 20', the side pieces 22—22, which carry supporting brackets 23—23, upon which the trays are placed. The tilting frame which supports the trays within the upright frame 20 is operated by means of a shaft 24 which extends through said upright frame from front to rear, with bearings therein, and is keyed to the tilting frame 20' by means of a key 25, whereby when said operating shaft 24 is rotated in either direction by means of a handle 26, all of the trays of a series are tilted to one side or the other, as illustrated in Fig. 1.

Above each heating apartment is a pivotally mounted damper plate 27, shown in dotted lines. This is adapted to be tilted in either direction with the trays. The currents of heated air are therefore directed upwardly by means of the damper plates 11—11 in the bottom of the apartment, toward one side or the other of the apartment, as most needed, and upwardly through the trays of material, the currents adjacent the side walls of the apartment being caught by the projecting baffle plates and directed inwardly between the trays. These currents of heated air, ladened with moisture from the material being dried, pass into the upper, roofed portion of the device, shown in Fig. 3 and indicated by the reference numeral 28. Here the moisture in the form of vapor is permitted to escape, being lighter than the atmosphere, through the flue 29, controlled with a guard 30, while a considerable portion of the heated air which has already been used is drawn downwardly through the chamber 31, in the rear of the drying apartments, and back into the heating chamber, passing around the fire box or furnace in its course. Within the heating chamber we prefer to place directing floors, as 32, to assist in directing the heated air upwardly, while at the same time said floor affords a dead air space below it, designated 33, which assists to conserve the heat within said heating chamber 7.

The front of each heating or drying apartment is provided with suitable doors, here shown to be double doors, whereby the upper, or the lower one, of each apartment can be opened separately for such inspection as may be necessary or desirable.

We are aware that changes can be made in the embodiment of the invention here shown for purposes of illustration without departing from the spirit thereof, and we do not, therefore, limit the invention to the particular showing here made, except as we may be limited by the hereto appended claims.

We claim:

1. In an evaporator, in combination, a drying apartment, a source of heated air directed upwardly through said apartment, dampers for regulating and directing said air currents, movably mounted sheet metal baffle plates within said drying apartment for directing air currents and for radiating heat, a truck adapted to be run into and out of said drying apartment, tray supporting devices on said truck and movable thereon, drying trays upon said supporting devices, and means for moving said supporting devices and trays into tilted positions, for the purposes indicated.

2. In combination with a drying apartment for drying matter, a truck provided with an upright supporting frame, movable supporting devices thereon, drying trays upon said supporting devices, and operating means for moving said supporting devices to tilt said trays simultaneously in either direction.

3. In an evaporator, in combination, a drying apartment, movable damper plates for controlling inlets and outlets thereof, movably mounted baffle plates or shutters at opposite sides thereof for directing the heating medium, a truck provided with supporting frame, drying trays movably mounted on said truck one above the other, and means for moving said trays simultaneously into tilted positions.

4. In an evaporator, in combination, a drying apartment, movably mounted damper plates for controlling the inlets and outlets thereof, sheet metal baffle plates movably mounted adjacent the side walls of said apartment, drying trays movably supported between said baffle plates, and means for moving said trays together into tilted positions, for the purpose mentioned.

Signed at Portland, Oregon, August 16th, 1912.

ALLAN B. KIRK.
OLIVER J. HOBSON.

In presence of—
G. T. NICHOLS,
G. A. NICHOLS.